(12) United States Patent
Jackson et al.

(10) Patent No.: US 11,745,732 B2
(45) Date of Patent: Sep. 5, 2023

(54) CERTIFIED CONTROL FOR SELF-DRIVING CARS

(71) Applicants: TOYOTA RESEARCH INSTITUTE, INC., Los Altos, CA (US); MASSACHUSETTS INSTITUTE OF TECHNOLOGY, Cambridge, MA (US)

(72) Inventors: Daniel Jackson, Newton, MA (US); Jonathan Decastro, Arlington, MA (US); Soon Ho Kong, Arlington, MA (US); Nikos Arechiga Gonzalez, San Mateo, CA (US); Dimitrios Koutentakis, Cambridge, MA (US); Feng Ping Angela Leong, Cambridge, MA (US); Mike Meichang Wang, Cambridge, MA (US); Xin Zhang, Cambridge, MA (US)

(73) Assignees: TOYOTA RESEARCH INSTITUTE, INC., Los Altos, CA (US); MASSACHUSETTS INSTITUTE OF TECHNOLOGY, Cambridge, CA (US)

( * ) Notice: Subject to any disclaimer, the term of this patent is extended or adjusted under 35 U.S.C. 154(b) by 951 days.

(21) Appl. No.: 16/696,546

(22) Filed: Nov. 26, 2019

(65) Prior Publication Data
US 2021/0009114 A1 Jan. 14, 2021

Related U.S. Application Data

(60) Provisional application No. 62/872,110, filed on Jul. 9, 2019.

(51) Int. Cl.
*B60W 30/09* (2012.01)
*B60W 30/095* (2012.01)
(Continued)

(52) U.S. Cl.
CPC ............ *B60W 30/09* (2013.01); *B60W 10/18* (2013.01); *B60W 10/20* (2013.01); *B60W 30/0956* (2013.01); *G05D 1/0077* (2013.01)

(58) Field of Classification Search
CPC ...... B60W 30/09; B60W 10/18; B60W 10/20; B60W 30/0956; B60W 60/001; B60W 50/0205; B60W 2050/0006; G05D 1/0077
See application file for complete search history.

(56) References Cited

U.S. PATENT DOCUMENTS 8,756,428 B2 * 6/2014 Touzeau ................ H04L 9/3247
713/168
8,781,669 B1 7/2014 Teller et al.
(Continued)

OTHER PUBLICATIONS

Wardzinski, Andrzej, "Safety Assurance Strategies for Autonomous Vehicles", 27th International Conference on Computer Safety, Reliability, and Security, Sep. 22-25, 2008, Newcastle upon Tyne, UK.
(Continued)

*Primary Examiner* — Thomas Ingram
(74) *Attorney, Agent, or Firm* — SEYFARTH SHAW LLP (57) ABSTRACT

A method for certified control of a self-driving ego vehicle is described. The method includes analyzing a safety situation of the self-driving ego vehicle to determine a proposed vehicle control action using a main controller of the self-driving ego vehicle. The method also includes presenting, by the main controller, the proposed vehicle control action to an interlock controller, including a certificate of the proposed vehicle control action. The method further includes checking a safety certification evidence from the certificate by the interlock controller using a predefined safety argument to verify the safety certification evidence of the certificate. The method also includes directing, by a low-level controller, the self-driving ego vehicle to perform a certified vehicle control action.

20 Claims, 6 Drawing Sheets

(51) Int. Cl.
    *B60W 10/20*         (2006.01)
    *B60W 10/18*         (2012.01)
    *G05D 1/00*          (2006.01)

(56) References Cited

U.S. PATENT DOCUMENTS

| | | | |
|---|---|---|---|
| 9,244,460 B2 * | 1/2016 | Debouk | B60W 50/045 |
| 2018/0050692 A1 * | 2/2018 | Kim | G05D 1/0212 |

OTHER PUBLICATIONS

Kuwata, Y., et al., "Real-Time Motion Planning with Applications to Autonomous Urban Driving", IEEE Transactions an Control Systems Technology, Sep. 2009, vol. 17, No. 5, pp. 1105-1118.

\* cited by examiner

CERTIFIED CONTROL FOR SELF-DRIVING CARS

CROSS-REFERENCE TO RELATED APPLICATION

The present application claims the benefit of U.S. Provisional Patent Application No. 62/872,110, filed on Jul. 9, 2019, and titled "CERTIFIED CONTROL FOR SELF-DRIVING CARS," the disclosure of which is expressly incorporated by reference herein in its entirety.

BACKGROUND

Field

Certain aspects of the present disclosure generally relate to machine learning and, more particularly, to a system and method for certified control of self-driving cars.

Background

Autonomous agents, such as self-driving cars and robots, are quickly evolving. Self-driving cars rely on various ways of perceiving an environment. Unfortunately, the various ways used by self-driving cars to perceive a surrounding environment are not entirely reliable. In addition, because self-driving cars have to interact with other vehicles, many critical concerns arise. For example, one critical concern is how to design vehicle control of an autonomous vehicle using machine learning.

Unfortunately, vehicle control by machine learning may be ineffective in situations involving complex interactions between vehicles (e.g., a situation where a controlled (ego) vehicle merges into a traffic lane). Machine learning techniques for vehicle control for selecting an appropriate vehicle control action of an ego vehicle are desired. For example, a selected speed/acceleration/steering angle of the controlled (ego) vehicle may be applied as a vehicle control action. These conventional machine learning techniques, however, do not certify the safety of selected vehicle control actions. Certified control of an ego vehicle is desired.

SUMMARY

A method for certified control of a self-driving ego vehicle is described. The method includes analyzing a safety situation of the self-driving ego vehicle to determine a proposed vehicle control action using a main controller of the self-driving ego vehicle. The method also includes presenting, by the main controller, the proposed vehicle control action to an interlock controller, including a certificate of the proposed vehicle control action. The method further includes checking a safety certification evidence from the certificate by the interlock controller using a predefined safety argument to verify the safety certification evidence of the certificate. The method also includes directing, by a low-level controller, the self-driving ego vehicle to perform a certified vehicle control action.

A non-transitory computer-readable medium having program code recorded thereon for certified control of a self-driving ego vehicle is described. The program code is executed by a processor. The program code includes program code to analyze a safety situation of the self-driving ego vehicle to determine a proposed vehicle control action using a main controller of the self-driving ego vehicle. The program code also includes program code to present, by the main controller, the proposed vehicle control action to an interlock controller, including a certificate of the proposed vehicle control action. The program code further includes program code to check a safety certification evidence from the certificate by the interlock controller using a predefined safety argument to verify the safety certification evidence of the certificate. The program code also includes program code to direct, by a low-level controller, the self-driving ego vehicle to perform a certified vehicle control action.

A system for certified control of a self-driving ego vehicle is described. The system includes a main controller configured to analyze a safety situation of the self-driving ego vehicle to determine a proposed vehicle control action. The system also includes an interlock controller configured to receive the proposed vehicle control action and a certificate of the proposed vehicle control action from the main controller. The interlock controller is further configured to verify safety certification evidence of the certificate. described. The system further includes a low-level controller configured to direct the self-driving ego vehicle to perform a certified vehicle control action.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Automation of vehicle control on highways is rapidly advancing. These automated vehicles are expected to reduce traffic accidents and improve traffic efficiency. In particular, machine learning techniques for vehicle control by selecting an appropriate vehicle control action of an ego vehicle are desired. For example, a selected speed/acceleration/steering angle of the controlled (ego) vehicle may be applied as a vehicle control action. These conventional machine learning techniques, however, do not certify the safety of the selected vehicle control actions. Certified control of an ego vehicle is desired. As described herein, certified control may refer to reliable control, safe control, or other like term in which the vehicle control is validated.

Certified vehicle control is a new architectural pattern for achieving high assurance of safety in autonomous vehicles. As with a traditional safety controller, a separate component oversees safety and intervenes to prevent safety violations. This separate component (along with sensors and actuators) provides a trusted base for ensuring safety, even if a main controller fails. In certified control, however, an interlock component (e.g. safety controller) does not directly use sensors to determine when to intervene. Instead, the main controller is responsible for certifying the safety of a proposed next action, and presenting this certification to the interlock component. In response, the interlock component intervenes if verification of the certificate fails. Because generating the certificate is a much more complex process than verification of the certificate, the interlock component may exhibit reduced complexity and size relative to the main controller.

Aspects of the present disclosure are directed to a system and method for achieving high assurance of safety in autonomous vehicles using a certified control pattern. This method includes analyzing a safety situation of autonomous vehicles and determining a suitable action (which may include continuing on its current course) using a main controller. The method also includes presenting the determined action by the main controller to an interlock component with a certificate of the safety of the determined action. For example, the certificate may include time stamped and signed evidence. This time stamped and signed evidence allows the main controller to pass on sensor data and for the interlock to confirm the determined action is not corrupt or fake.

According to this aspect of the present disclosure, the method includes checking safety evidence by the interlock component using a predefined safety argument. For example, if the evidence is credible, the interlock component passes the action on to a low-level controller; however, if the evidence is not credible, the interlock component intervenes and replaces the action with a safety mitigation. For example, the safety mitigation may include braking, steering, and/or throttle. In this example, the interlock component includes a low-level controller that translates commanded actions into actuations of the brakes, throttle, and steering. In aspects of the present disclosure, the interlock component does not use sensors to directly determine whether the vehicle is in a safe situation.

Figure 1:
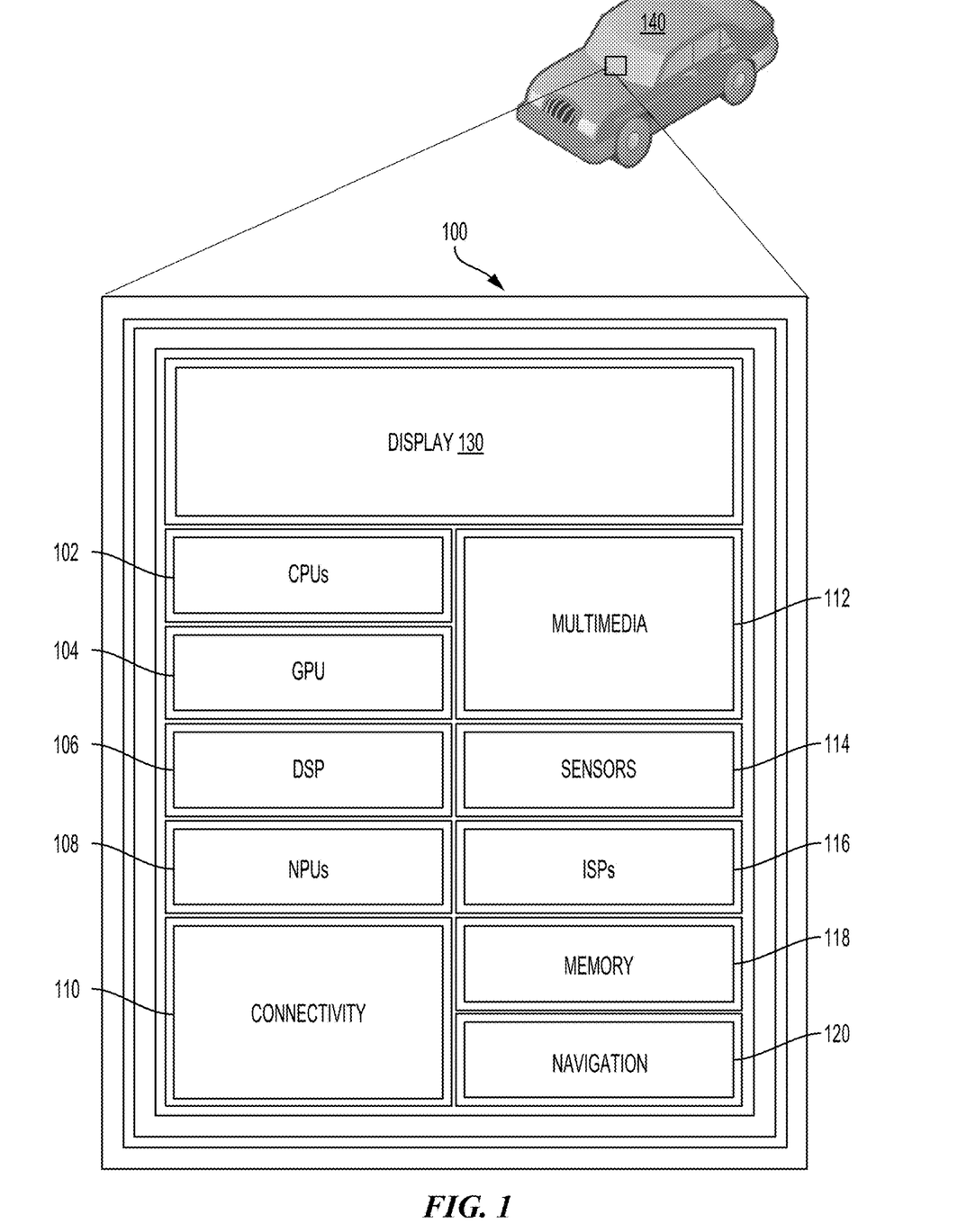
FIG. 1 illustrates an example implementation of designing a neural network using a system-on-a-chip (SOC) of a certified vehicle control system, in accordance with aspects of the present disclosure.

FIG. 1 illustrates an example implementation of the aforementioned system and method for a certified vehicle control system using a system-on-a-chip (SOC) 100 of a vehicle vision system for an autonomous vehicle 140. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a certified vehicle control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 140. In this arrangement, the autonomous vehicle 140 may include a processor and other features of the SOC 100. In this aspect of the present disclosure, instructions loaded into a processor (e.g., CPU 102) or the NPU 108 of the autonomous vehicle 140 may include code for analyzing a safety situation of the autonomous vehicle to determine a suitable action using a main controller of the autonomous vehicle based on an image captured by the sensor processor 114. The instructions loaded into a processor (e.g., CPU 102) may also include code for presenting, by the main controller, the determined, suitable action to an interlock component with a safety certificate of the determined, suitable action in response to the image captured by the sensor processor 114.

Figure 2:
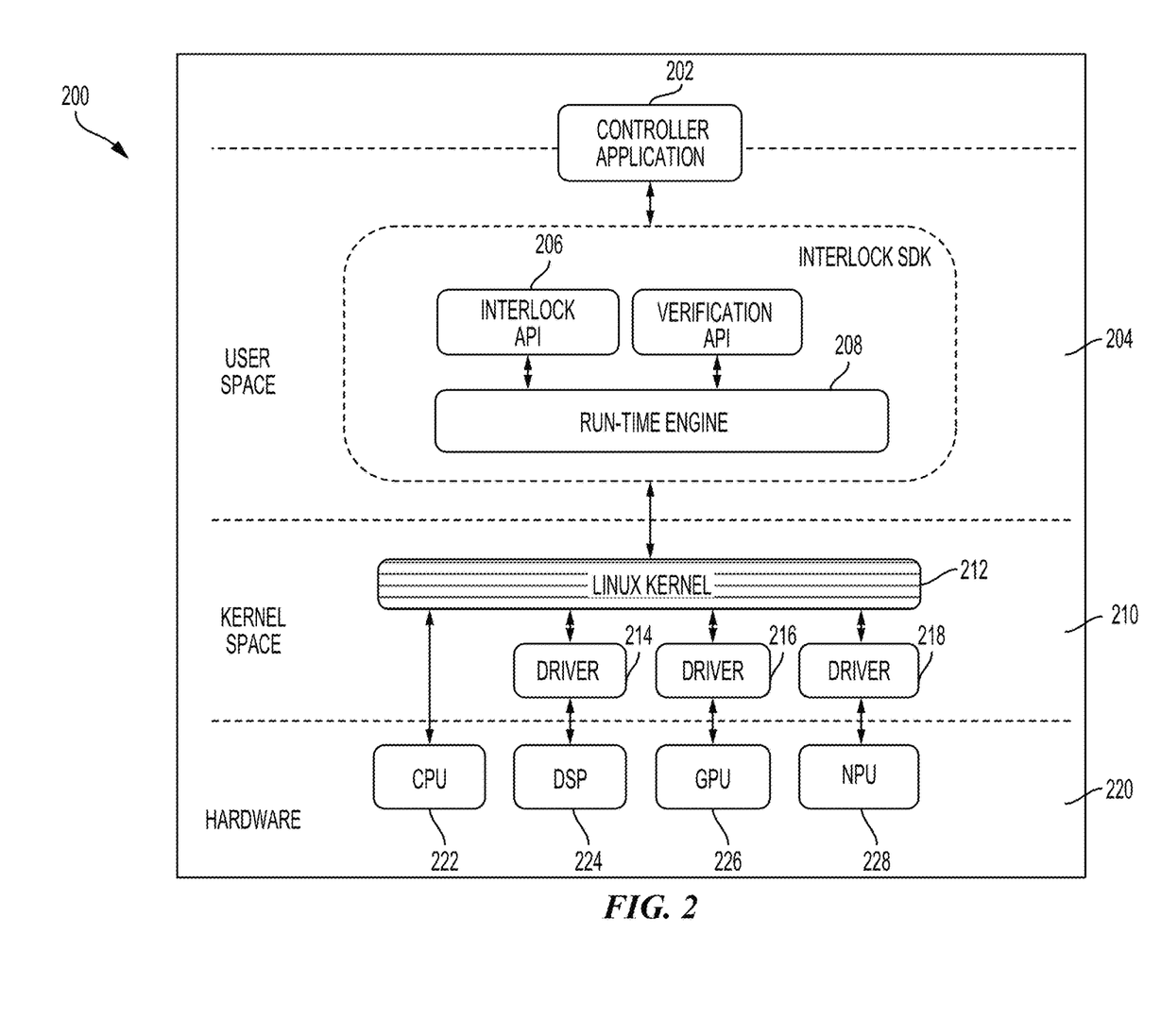
FIG. 2 is a block diagram illustrating an exemplary software architecture that may modularize artificial intelligence (AI) functions for a certified vehicle control system, according to aspects of the present disclosure.

FIG. 2 is a block diagram illustrating a software architecture 200 that may modularize artificial intelligence (AI) functions for certifying the safety of a selected vehicle control action of an autonomous agent, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202. While FIG. 2 describes the software architecture 200 for certifying a selected vehicle control action of an autonomous agent, it should be recognized that certified vehicle action control functionality is not limited to autonomous agents. According to aspects of the present disclosure, vehicle action control functionality is applicable to any vehicle type.

The controller application 202 may be configured to call functions defined in a user space 204 that may, for example, provide for certified vehicle action control services. The controller application 202 may make a request for compiled program code associated with a library defined in an interlock application programming interface (API) 206 to certify the safety of a selected vehicle control action based on a safety certificate provided to the interlock API 206. In response, compiled code of the interlock API 206 may intervene with a selected safety mitigation action if verification of the safety certificate fails.

A run-time engine 208, which may be compiled code of a runtime framework, may be further accessible to the controller application 202. The controller application 202 may cause the run-time engine 208, for example, to take actions for certified control of the autonomous agent. When an ego vehicle encounters a safety situation, the run-time engine 208 may in turn send a signal to an operating system 210, such as a Linux Kernel 212, running on the SOC 220. FIG. 2 illustrates the Linux Kernel 212 as software architecture for certified control of an autonomous agent using a certified control pattern. It should be recognized, however, that aspects of the present disclosure are not limited to this exemplary software architecture. For example, other kernels may provide the software architecture to support certified vehicle control action functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Aspects of the present disclosure are directed to a system and method for certified control of autonomous agents (e.g., self-driving cars). Verification of autonomous agents is an important task for creating and certifying new autonomous systems, such as driverless cars and robots. Conventional systems for verifying autonomous systems and/or agents rely on logging the behavior of the system and/or agents under study while the system/agent interacts with its surrounding environment. This verification process may involve creating stress situations to test the behavior of agents in corner cases or atypical situations.

The growing complexity of software in autonomous vehicles makes it more difficult to ensure reliability of these autonomous vehicles. For example, the risk of unexpected catastrophic failures remains, although aggregate safety measures are improved. In addition, the risk of catastrophic failures is exacerbated by the threat of malicious attacks. Ex post facto methods for obtaining assurance are unlikely feasible in the near term; namely, statistical testing would involve billions of miles traveled. In addition, formal verification of software in autonomous vehicles is not currently feasible for systems of significant magnitude, especially those including machine learning components.

An effective solution for systems that control a physical plant is a safety controller to augment a main controller. The safety controller may monitor the surrounding world of an ego vehicle and intervenes when an accident is imminent. By maintaining a safety envelope, the safety controller ensures time and space is available to prevent disaster whenever intervention is performed.

Certified control is a new architectural pattern for achieving high assurance of safety in autonomous vehicles. In aspects of the present disclosure, an interlock controller provides a separate component from a main controller to oversee safety and intervene to prevent safety violations. This interlock controller (e.g., along with sensors and actuators) provides a trusted base to ensure safety even if verification of a selected vehicle control action from the main controller fails. In certified control, however, the interlock does not use the sensors to directly determine when to intervene. Instead, a high-level controller is responsible for presenting the interlock controller with a safety certificate, including safety evidence of a selected vehicle control action.

In aspects of the present disclosure, an interlock controller is configured to check safety certificates, and intervenes if a check fails. Because generating a safety certificate is usually more complex than checking one, a configuration of the interlock controller may be reduced and simplified relative to a high-level controller. The design of a certified vehicle control system is based on isolating the interlock controller from the main controller. In addition, prioritized access of the interlock controller (e.g., to actuators, sensors, etc.) allows the interlock controller to provide a trusted base. Failures and compromises of components outside the trusted base can be ignored in making an assurance case. Providing a separate interlock controller enables assuring of selected vehicle behavior correctness is more feasible, for example, as shown in FIG. 3.

Figure 3:
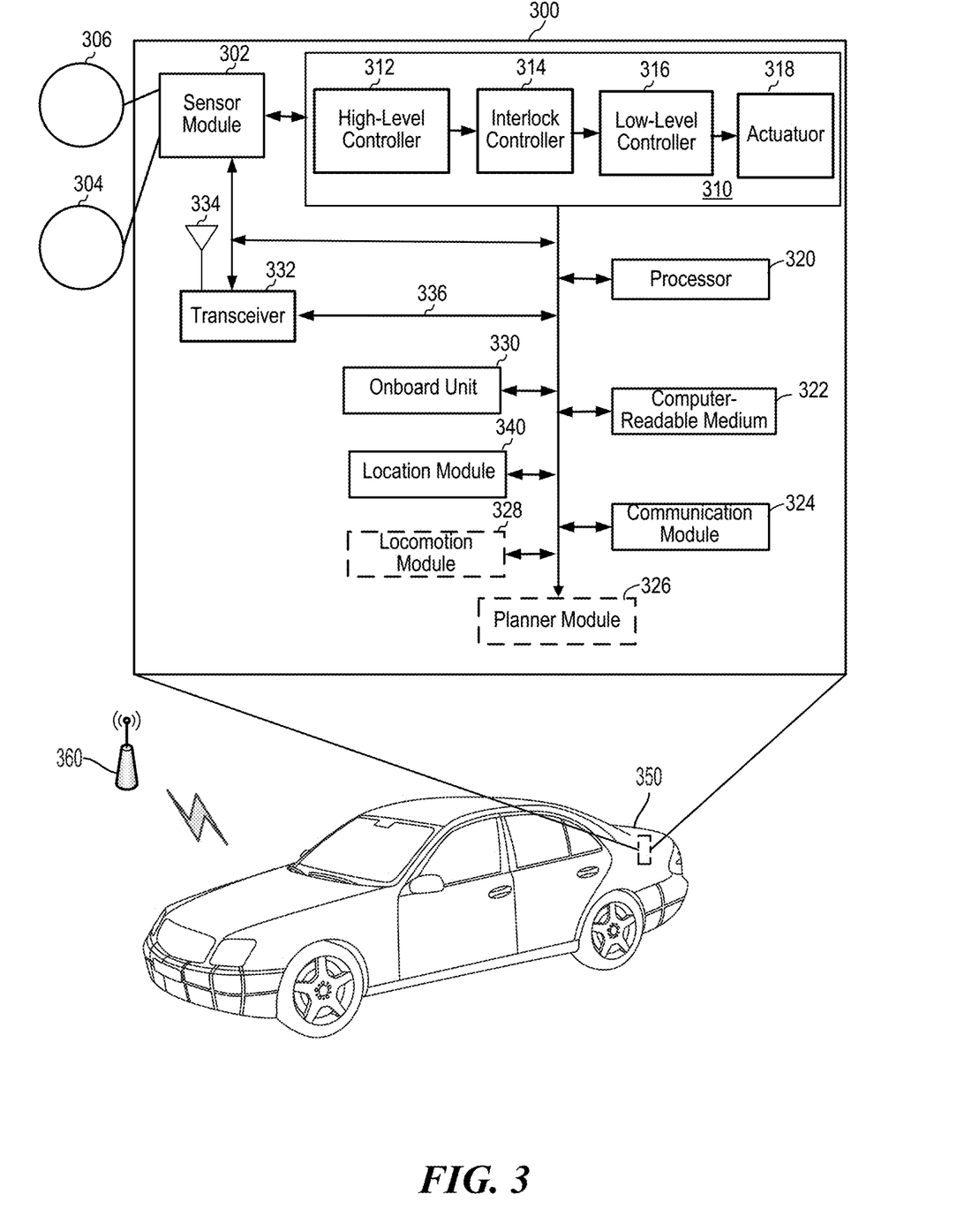
FIG. 3 is a diagram illustrating a hardware implementation for a certified vehicle control system, according to aspects of the present disclosure.

FIG. 3 is a diagram illustrating a hardware implementation for a certified vehicle control system 300, according to aspects of the present disclosure. The certified vehicle control system 300 may be configured for improved safety of an ego vehicle by using certified control patterns. The certified vehicle control system 300 may be a component of a vehicle, a robotic device, or other non-autonomous device (e.g., non-autonomous vehicles, ride-share cars, etc.). For example, as shown in FIG. 3, the certified vehicle control system 300 is a component of a car 350. Aspects of the present disclosure are not limited to the certified vehicle control system 300 being a component of the car 350. Other devices, such as a bus, motorcycle, or other like non-autonomous vehicle, are also contemplated for implementing the certified vehicle control system 300. In this example, the car 350 may be autonomous or semi-autonomous; however, other configurations for the car 350 are contemplated.

The certified vehicle control system 300 may be implemented with an interconnected architecture, represented generally by an interconnect 336. The interconnect 336 may include any number of point-to-point interconnects, buses, and/or bridges depending on the specific application of the certified vehicle control system 300 and the overall design constraints. The interconnect 336 links together various circuits including one or more processors and/or hardware modules, represented by a sensor module 302, a certified vehicle controller 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The certified vehicle control system 300 includes a transceiver 332 coupled to the sensor module 302, the certified vehicle controller 310, the processor 320, the computer-readable medium 322, the communication module 324, the planner module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit information for the certified vehicle controller 310 to/from connected vehicles within the vicinity of the car 350.

The certified vehicle control system 300 includes the processor 320 coupled to the computer-readable medium 322. The processor 320 performs processing, including the execution of software stored on the computer-readable medium 322 to provide functionality according to the disclosure. The software, when executed by the processor 320, causes the certified vehicle control system 300 to perform the various functions described for certified control of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the certified vehicle controller 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)—compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, Wi-Fi, long term evolution (LTE), 4G, 3G, etc. The communication module 324 may also communicate with other components of the car 350 that are not modules of the certified vehicle control system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The certified vehicle control system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgment). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn his/her attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The certified vehicle controller 310 may be in communication with the sensor module 302, the processor 320, the computer-readable medium 322, the communication module 324, the planner module 326, the locomotion module 328, the location module 340, the onboard unit 330, and the transceiver 332. In one configuration, the certified vehicle controller 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the certified vehicle controller 310 may receive sensor data directly from the first sensor 306 and the second sensor 304 to select, for example, a certified vehicle control action.

As shown in FIG. 3, the certified vehicle controller 310 includes a high-level controller 312 (e.g., a main controller), an interlock controller 314, a low-level controller 316, and an actuator 318. The high-level controller 312, the interlock controller 314, the low-level controller 316, and actuator 318 may be components of a same or different artificial neural network, such as a deep convolutional neural network (CNN). The certified vehicle controller 310 is not limited to a CNN. The certified vehicle controller 310 receives a data stream from the first sensor 306 and/or the second sensor 304. The data stream may include a 2D RGB image from the first sensor 306 and LiDAR data points from the second sensor 304. The data stream may include multiple frames, such as image frames of signed readings.

In this configuration of the certified vehicle controller 310, the components of the high-level controller 312 may include a planner, sensor fusion, and perceptual analyses to select a vehicle control action for the car 350. Accordingly, the planner module 326 is shown as optional and omitted when implemented as part of the high-level controller.

Aspects of the present disclosure propose a new approach to isolate and make the interlock controller independent from the high-level controller. This configuration of the interlock controller 314 is small and simple, while at the same time accommodating rich situational awareness. In this configuration, the interlock controller 314 does not use the sensor data to directly determine whether the car 350 is in a safe situation. Instead, the interlock controller 314 may audit the actions taken by the high-level controller 312, for example, as further illustrated in FIG. 4.

Figure 4:
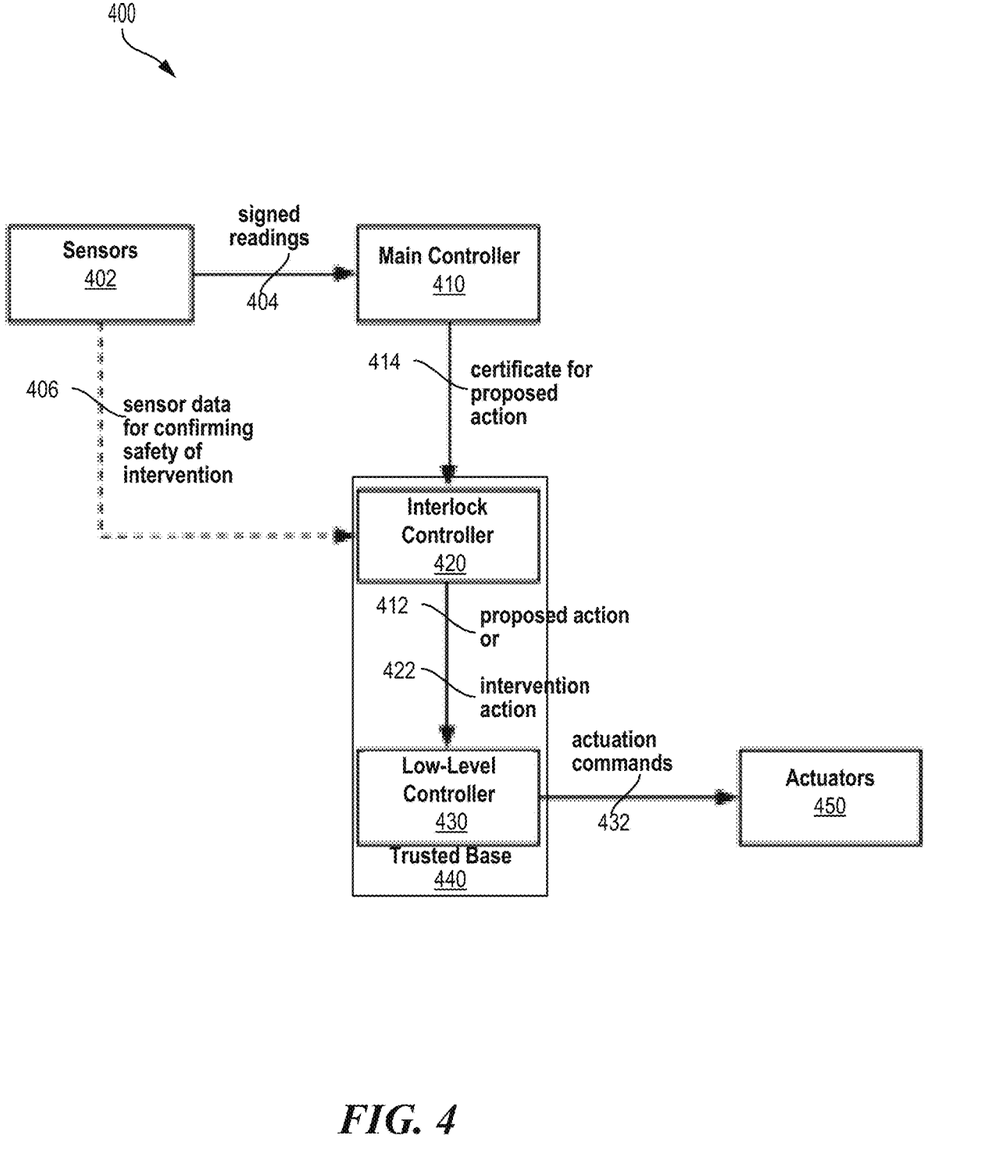
FIG. 4 further illustrates a certified vehicle controller of the certified vehicle control system of FIG. 3, according to aspects of the present disclosure.

FIG. 4 further illustrates a certified vehicle controller of a certified vehicle control system, according to aspects of the present disclosure. In this configuration, a certified control system includes a certified vehicle controller 400, such as the certified vehicle controller 310, as shown in FIG. 3. The certified vehicle controller 400 includes a main controller 410 (e.g., a high-level controller), an interlock controller 420, and a low-level controller 430. These components of the certified vehicle controller 400 may be configured according to the high-level controller 312, the interlock controller 314, and the low-level controller 316 of FIG. 3.

The configuration of the certified vehicle controller 400 of FIG. 4 is provided to further illustrate certified control features of the certified vehicle controller 310 of FIG. 3. During operation, the main controller 410 analyzes a situation of an ego vehicle and determines a proposed vehicle control action 412 (which may include continuing on its current course) for each control cycle. The main controller 410 determines the proposed vehicle control action 412 (e.g., changing the current course) from signed readings 404 received from sensors 402 of the ego vehicle.

According to aspects of the present disclosure, the proposed vehicle control action 412 is presented to the interlock controller 420, along with a certificate 414 for the proposed vehicle control action 412. The certificate 414 may be a safety certificate, including evidence of the safety of the proposed vehicle control action 412. In this configuration, the interlock controller 420 checks safety evidence from the certificate 414 using a predefined safety argument. The interlock controller 420 verifies safety certification information from the certificate 414 and, if credible, passes the proposed vehicle control action 412 to the low-level controller 430. Otherwise, the interlock controller 420 intervenes and replaces the proposed vehicle control action 412 with an intervention action 422 (e.g., safety mitigation action such as braking). In this configuration, sensor data 406 is used by the interlock controller 420 to confirm the safety of the intervention action 422, which may be referred to as intervention vehicle control action.

In this configuration, a trusted base 440 is not limited solely to the interlock controller 420. As with a safety controller, the interlock controller 420 relies on the sensors 402 and actuators 450. In this aspect of the present disclosure, the low-level controller 430, which translates proposed vehicle control action 412/intervention action 422 into actuation commands 432 of the brakes, throttle, and steering, forms a portion of the trusted base 440 to provide certified vehicle control for a self-driving vehicle. Nevertheless, the software components of the main controller 410 (e.g., a planner, sensor fusion, and perceptual analyses) are excluded from the trusted base 440. As a result, the bulk of the software complexity from a high-level controller is excluded from the trusted base 440.

Figure 5:
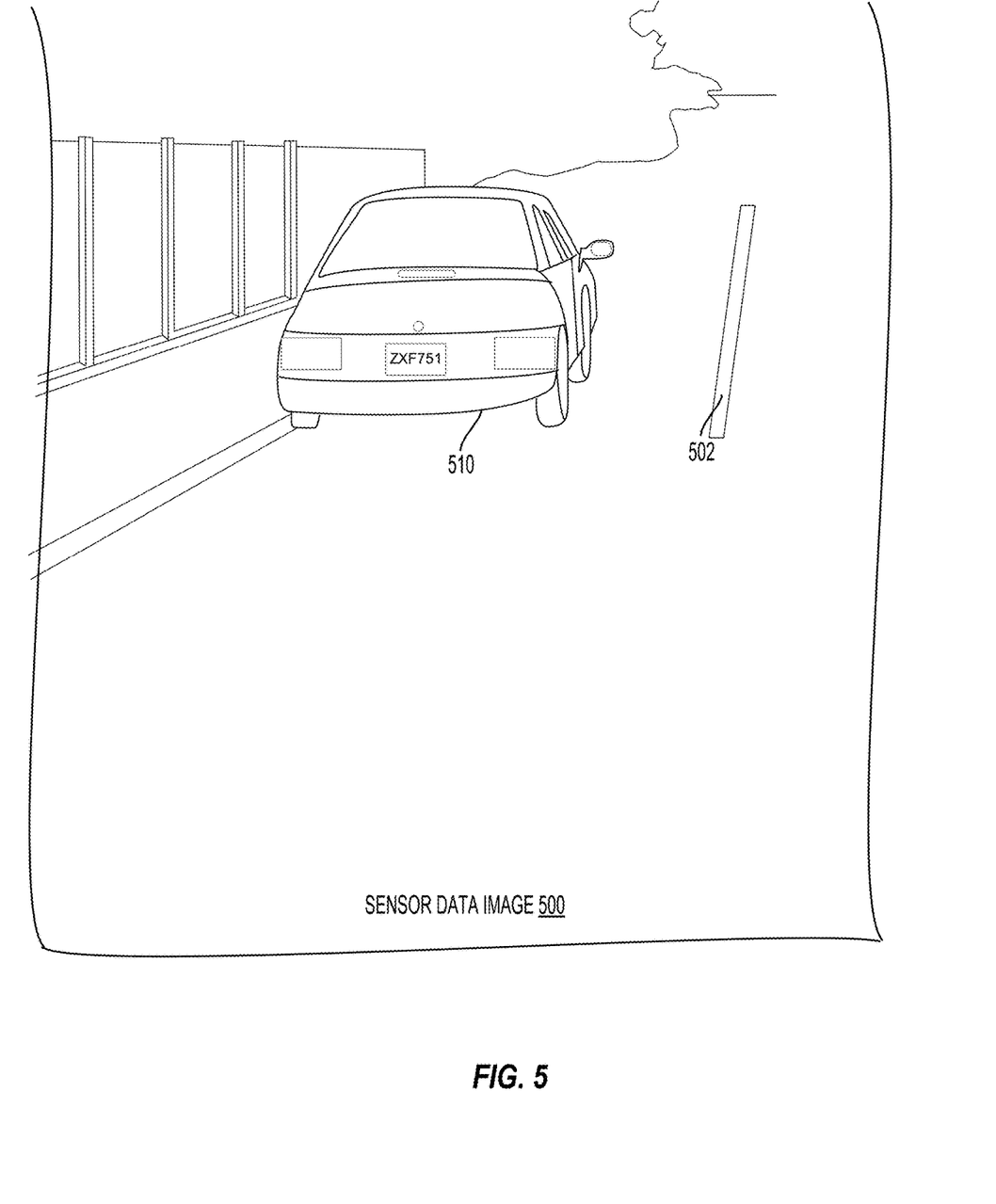
FIG. 5 illustrates a sensor data image captured by an ego vehicle subject operating under certified vehicle control, according to aspects of the present disclosure.

FIG. 5 illustrates a sensor data image 500 captured by an ego vehicle subject to operating under certified vehicle control, according to aspects of the present disclosure. To illustrate certified control of an ego vehicle, consider a simple scenario shown by the sensor data image 500 of an autonomous car (e.g., controlled ego vehicle) driving on a straight segment of a highway 502.

In this example, the main controller 410 determines (e.g., using LiDAR) the only obstacle ahead of the ego vehicle is a lead car 510 traveling in the same direction and at a distance of 100 meters away. The controlled ego vehicle is driving towards the lead car 510 at a speed of 10 meters per second (m/s), and can decelerate at a rate of 5 meters per second squared (m/s$^2$). This implies a stopping distance of 10 meters, which would rise to 40 meters if the speed were doubled. The main controller 410 may propose a vehicle control action of increasing a speed of the ego vehicle to 20 m/s.

According to aspects of the present disclosure, the main controller 410 generates a certificate 414 for the proposed vehicle control action 412. The certificate 414 may include safety certification information to enable safety verification of the proposed vehicle control action by the interlock controller 420. For example, the safety verification information should show the proposed vehicle control action 412 maintains a safe separation from the lead car 510, even if the lead car 510 instantaneously comes to a complete stop.

For example, the main controller 410 presents the interlock controller 420 with safety certification evidence in the certificate 414. The safety certification evidence may include the controlled ego vehicle's current speed, and evidence of no obstacles within 100 meters. The certificate 414 may include a timestamped speed reading from a specialized speed computation unit (e.g., locomotion module 328). The speed reading may rely on timing wheel rotations, and the speed reading may be signed with a private key of the specialized speed computation unit. The certificate 414 may also include selected LiDAR points demonstrating there is no obstacle within 100 meters (e.g., along various trajectories). The LiDAR points may be selected from the contour of the lead car 510 extracted using a perception algorithm from LiDAR data. The selected LiDAR points are also timestamped and signed (in this case by a LiDAR unit).

In this example, the various pieces of evidence from the certificate 414 are passed to the interlock controller 420. The certificate 414 may contain: (a) the current speed; (b) selected LiDAR points; (c) the claimed distance between the controlled ego vehicle and the lead car 510; and/or (d) the proposed action (increasing speed to 20 m/s). In response, the interlock controller 420 verifies (a) the speed and (b) the distance readings. For example, the interlock controller 420 verifies the timestamps are current and the signatures are verified using the respective public keys. In addition, the interlock controller 420 verifies (c) the claimed distance is no greater than the distances in the distance readings and (d) the proposed action is safe given these readings and assumptions about the controlled ego vehicle's maximum deceleration.

According to aspects of the present disclosure, if the certificate 414 is verified, the interlock controller 420 passes the proposed vehicle control action 412 to the low-level controller 430. Otherwise, the interlock controller 420 replaces the proposed vehicle control action 412 with an intervention action 422. For example, the intervention action 422 may include a braking action to bring the self-driving ego vehicle to a stop. Aspects of the present disclosure may operate according to the following principles.

Tolerance for errors. In the use case described above, the interlock controller 420 rejects the certificate 414 and selects immediate braking as the intervention action 422. Alternatively, the interlock controller 420 could rely on previous (e.g., successfully verified) certificates that establish the distance between the self-driving ego vehicle and the lead car 510. Some latitude may be desirable here, but, in general, a failed verification means that the main controller 410 is broken and the self-driving ego vehicle is driving blind.

Safety of intervention. The braking intervention itself may be dangerous (for example, if there is a truck bearing down on the lead car 510 from behind). For this reason, it may be desirable for the interlock controller 420 to have direct access to the sensors 402. Access to the sensors 402 may be solely to determine whether the intervention action 422, itself, is safe (shown as a dashed arrow in the figure).

Non-certifiable perception. LiDAR-based perceptions seems straightforwardly amenable to generating evidence. However complex the algorithm for analyzing the LiDAR point cloud, computing contours, etc., it should be possible to find a subset of readings to substantiate the claim that the detected obstacle is a certain distance away. But such a strategy would likely not work for camera-based perception, because there is no subset of the pixels that would convincingly corroborate the inferred situation. This does not mean that such perception mechanisms could not be used, just that they would have to be augmented with mechanisms that can provide evidence, for example, according to other aspects of the present disclosure. For example, the main controller might identify the car in front as a particular model in a particular pose, and might send small parts of the larger image as evidence for the presence of notable features, such as wheels.

Lane following. A convincing safety case for the proposed action may include evidence of road and lane layout. In the use case of the described scenario, the lane in which the self-driving ego car is traveling extends forward the requisite distance. To do so, the main controller 410 might pass onto the interlock controller 420 some map segments and a GPS reading signed by respective specialized units.

Misleading certificates. Suppose an obstacle is a trailer carrying a pile of pipes, and the certificate contains LiDAR points that correspond to trajectories that pass through the pipes. This scenario may give the misleading impression that the obstacle is further away than it really is in actuality. This problem reflects the limitations of perception and thus seems unavoidable, and could be countered by raising the bar for evidence (e.g., by requiring more LiDAR points in the certificate). Certified control does admittedly exacerbate this problem in one respect: one could imagine (perhaps implausibly) a malicious compromise of the main controller 410 that seeks opportunities to create such misleading certificates, although the effectiveness of such an attack seems limited.

Incomplete model. The credibility of the certificate 414 depends on an underlying model of the world (shared by the main controller 410 and interlock controller 420). This model, however, is incomplete, so the interlock controller 420 may only guard against accidents that are implicitly covered by the model. For example, the certificate 414 might not include evidence that there are no boulders rolling down a mountain adjacent to the road; that the weather conditions have not made the road surface more slippery than usual; or that no portion of the road has collapsed ahead of the self-driving ego vehicle due to an earthquake.

Figure 6:
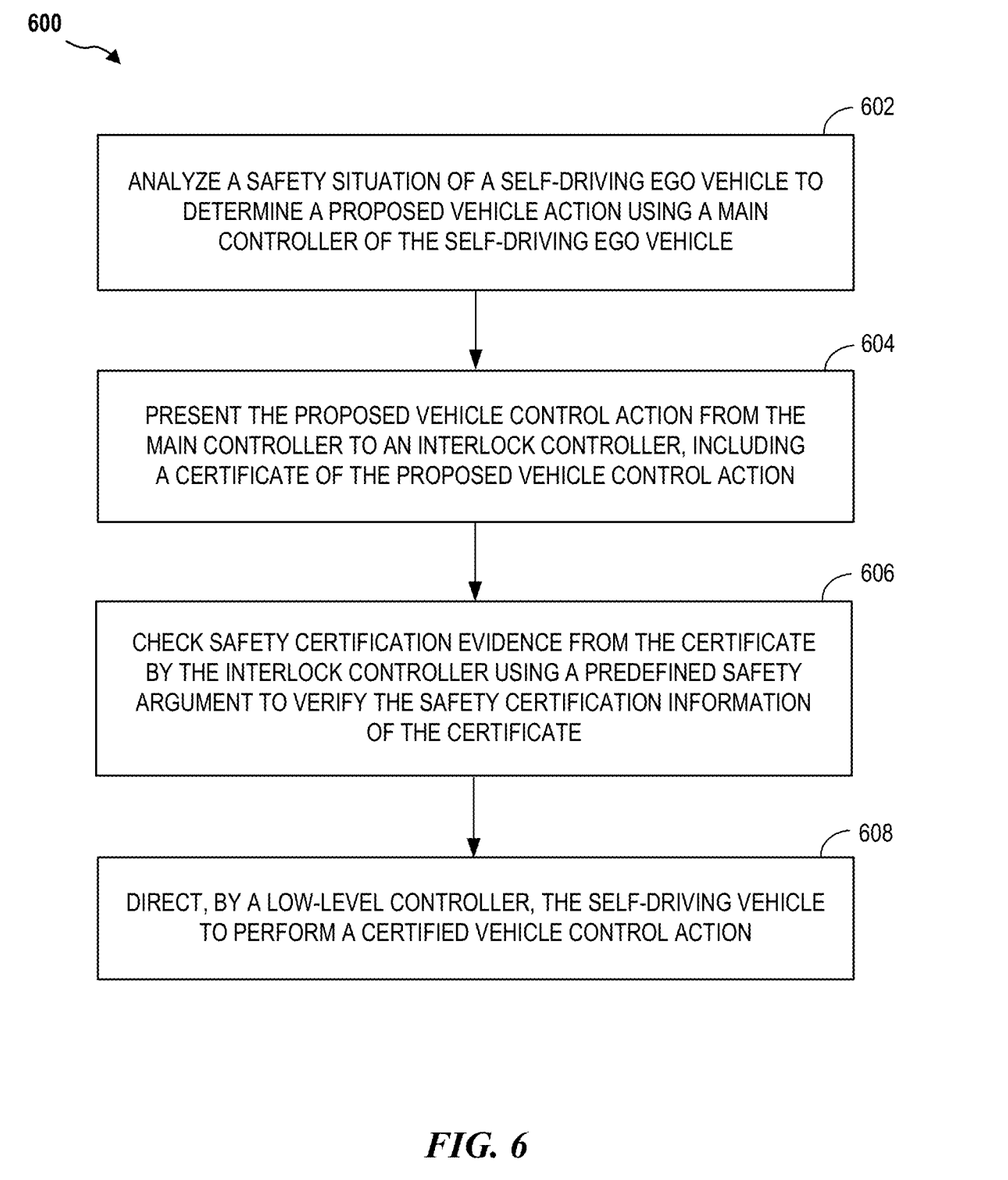
FIG. 6 is a flowchart illustrating a method for certified control of a self-driving ego vehicle, according to aspects of the present disclosure.

FIG. 6 is a flowchart illustrating a method for certified control of a self-driving ego vehicle, according to aspects of the present disclosure. A method 600 of FIG. 6 begins at block 602, in which a main controller of a self-driving ego vehicle analyses a safety situation of the self-driving ego vehicle to determine a proposed vehicle action. For example, as described in FIG. 5, main controller 410 may propose a vehicle control action of increasing a speed of the self-driving ego vehicle to 20 m/s. At block 604, the main controller presents the proposed vehicle control action to an interlock controller, including a certificate of the proposed vehicle control action. For example, as shown in FIG. 4, the main controller 410 generates a certificate 414 for the proposed vehicle control action 412, which is provided to the interlock controller 420.

Referring again to FIG. 6, at block 606, the interlock controller checks safety certification evidence from the certificate using a predefined safety argument to verify the safety certification information of the certificate. For example, as shown in FIGS. 4 and 5, the safety verification information should show the proposed vehicle control action 412 maintains a safe separation from the lead car 510, even if the lead car 510 instantaneously comes to a complete stop. At block 608, a low-level controller directs the self-driving ego vehicle to perform a certified vehicle control action. For example, as shown in FIGS. 4 and 5, if the certificate 414 is verified, the interlock controller 420 passes the proposed vehicle control action 412 to the low-level controller 430. Otherwise, the interlock controller 420 replaces the proposed vehicle control action 412 with an intervention action 422. For example, the intervention action 422 may include a braking action to bring the self-driving ego vehicle to a stop.

Aspects of the present disclosure may use a certified control pattern to achieve high assurance of safety in a self-driving ego vehicle. Certified control exploits a gap in complexity between generating a solution to a problem and checking the solution. The risks of unpredictable behavior in components (such as an autonomous car's perception) based on machine learning are widely recognized, and have led to various proposals, including applying formal verification and using run-time assertions as sanity checks. For example, stopping distances may be used as a check on the main controller. Safety or dependability cases that include reasoning about both software, hardware and environment are checked at runtime by using the certificate 414 and enable reduction of the trusted base 440.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for certified control of a self-driving ego vehicle, comprising:
    analyzing a safety situation of the self-driving ego vehicle to determine a proposed vehicle control action using a main controller of the self-driving ego vehicle;
    presenting, by the main controller, the proposed vehicle control action to an interlock controller, including a certificate of the proposed vehicle control action;
    checking a safety certification evidence from the certificate by the interlock controller using a predefined safety argument to verify the safety certification evidence of the certificate, by accessing sensor data from the safety certification evidence of the certificate and using the sensor data to confirm safety of the proposed vehicle control action; and
    directing, by a low-level controller, the self-driving ego vehicle to perform a certified vehicle control action.

2. The method of claim 1, in which directing further comprises passing, by the interlock controller, the proposed vehicle control action to the low-level controller if the safety certification evidence from the certificate is verified by the interlock controller.

3. The method of claim 1, further comprising:
    replacing, by the interlock controller, the proposed vehicle control action with an intervention vehicle control action if the safety certification evidence from the certificate is not verified; and
    directing, by the low-level controller, the self-driving ego vehicle to perform the intervention vehicle control action.

4. The method of claim 3, in which the intervention vehicle control action comprises braking, throttling, and/or steering.

5. The method of claim 3, in which directing comprising translating, by the low-level controller, the certified vehicle control action into actuations of brakes, throttle, and/or steering.

6. The method of claim 3, in which the interlock controller uses the sensor data to confirm safety of the intervention vehicle control action.

7. The method of claim 1, in which the safety certification evidence of the certificate includes time stamped and signed evidence to verify the proposed vehicle control action is safe.

8. The method of claim 1, in which the certified vehicle control action comprises the proposed vehicle control action.

9. The method of claim 1, in which the certified vehicle control action comprises an intervention vehicle control action selected by the interlock controller.

10. A non-transitory computer-readable medium having program code recorded thereon for certified control of a self-driving ego vehicle, the program code being executed by a processor and comprising:
    program code to analyze a safety situation of the self-driving ego vehicle to determine a proposed vehicle control action using a main controller of the self-driving ego vehicle;
    program code to present, by the main controller, the proposed vehicle control action to an interlock controller, including a certificate of the proposed vehicle control action;
    program code to check a safety certification evidence from the certificate by the interlock controller using a predefined safety argument to verify the safety certification evidence of the certificate, by program code to access sensor data from the safety certification evidence of the certificate and use the sensor data to confirm safety of the proposed vehicle control action; and
    program code to direct, by a low-level controller, the self-driving ego vehicle to perform a certified vehicle control action.

11. The non-transitory computer-readable medium of claim 10, further comprising:
    program code to replace, by the interlock controller, the proposed vehicle control action with an intervention vehicle control action if the safety certification evidence from the certificate is not verified; and
    program code to direct, by the low-level controller, the self-driving ego vehicle to perform the intervention vehicle control action.

12. The non-transitory computer-readable medium of claim 11, in which the program code to direct comprises program code to translate, by the low-level controller, the certified vehicle control action into actuations of brakes, throttle, and/or steering.

13. The non-transitory computer-readable medium of claim 10, further comprising program code to pass, by the interlock controller, the proposed vehicle control action to the low-level controller if the safety certification evidence from the certificate is verified by the interlock controller.

14. The non-transitory computer-readable medium of claim 10, in which the safety certification evidence of the certificate includes time stamped and signed evidence to verify the proposed vehicle control action is safe.

15. The non-transitory computer-readable medium of claim 10, in which the certified vehicle control action comprises an intervention vehicle control action selected by the interlock controller.

16. A system for certified control of a self-driving ego vehicle, the system comprising:
    a main controller configured to analyze a safety situation of the self-driving ego vehicle to determine a proposed vehicle control action;
    an interlock controller configured to receive the proposed vehicle control action and a certificate of the proposed vehicle control action from the main controller, the interlock controller further configured to verify safety certification evidence of the certificate, by accessing sensor data from the safety certification evidence of the certificate and using the sensor data to confirm safety of the proposed vehicle control action; and a low-level controller configured to direct the self-driving ego vehicle to perform a certified vehicle control action.

17. The system of claim 16, in which the interlock controller is further configured to the proposed vehicle control action to the low-level controller if the safety certification evidence from the certificate is verified by the interlock controller.

18. The system of claim 16, in which the interlock controller is further configured to replace the proposed vehicle control action with an intervention vehicle control action if the safety certification evidence from the certificate is not verified.

19. The system of claim 18, in which the low-level controller is further configured to direct the self-driving ego vehicle to perform the intervention vehicle control action.

20. The system of claim 16, in which the low-level controller is further configured to translate the certified vehicle control action into actuations of brakes, throttle, and/or steering of the self-driving ego vehicle.

* * * * *